Oct. 20, 1931.  H. L. BROWN  1,828,279
APPARATUS AND METHOD FOR THE RECOVERY OF CHEMICALS FROM PULP MAGMA
Filed July 24, 1930
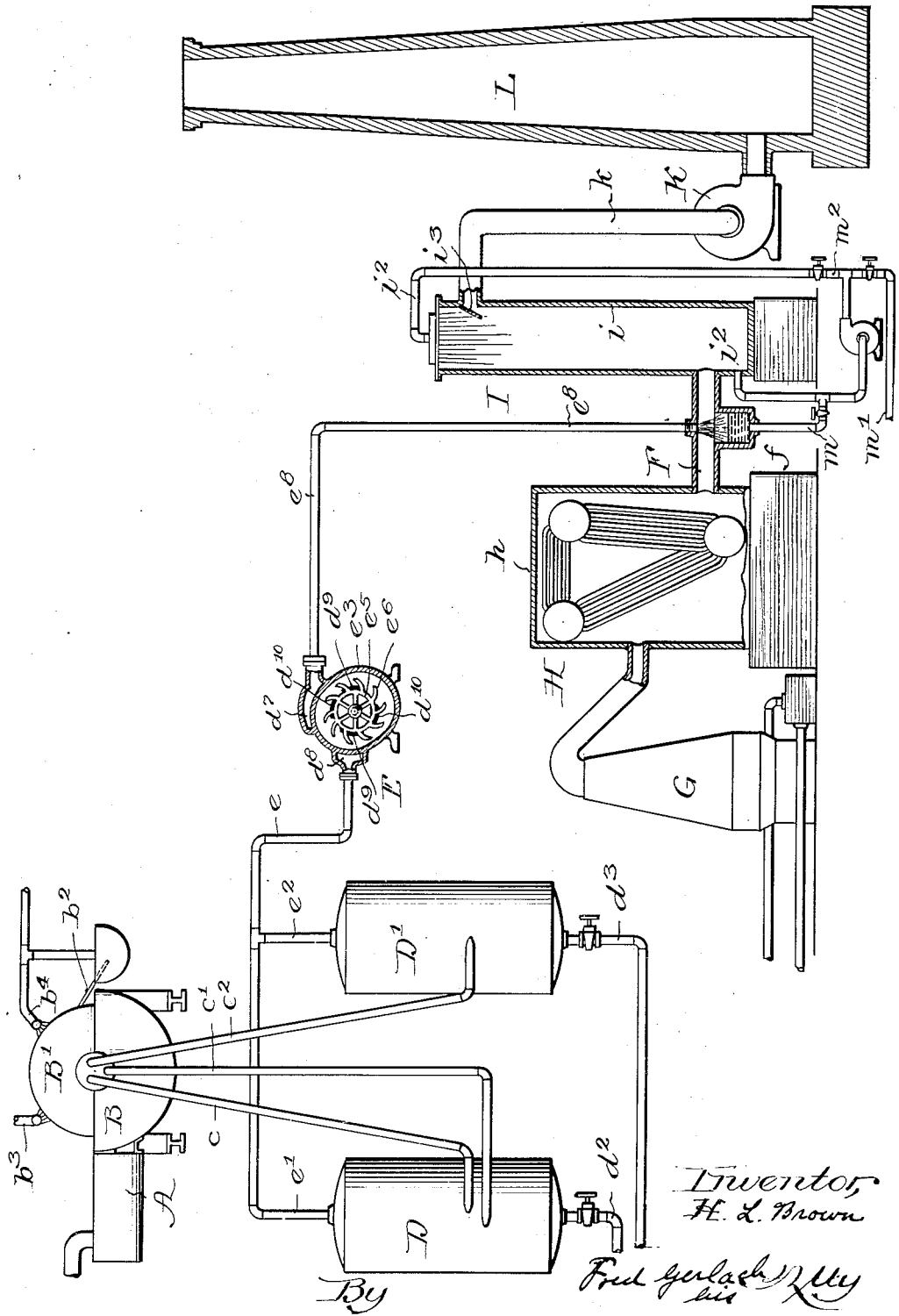

Patented Oct. 20, 1931

1,828,279

UNITED STATES PATENT OFFICE

HENRY LUTCHER BROWN, OF HOUSTON, TEXAS

APPARATUS AND METHOD FOR THE RECOVERY OF CHEMICALS FROM PULP MAGMA

Application filed July 24, 1930. Serial No. 470,256.

The invention relates to the manufacture of pulp, such, for example, as is used for paper making, and more particularly to the separation and recovery for re-use of all the digester chemicals from the pulp.

When certain organic materials are present in the pulp, foaming or frothing of the digester liquor occurs, particularly while the pulp is being filtered and washed in a rotary suction filter.

One object of the invention is to provide an improved method and apparatus for recovering the chemicals from the foam or froth so produced.

Another object is to provide a system and apparatus for recovering chemicals from the foam, by subjecting it to direct contact with hot combustion gases.

Another object is to provide a system and apparatus for recovering from the foam any completely dehydrated chemicals.

A still further object is to provide apparatus with a vacuum pump which is adapted to handle foam and pass it to the heater for condensing and for dehydrating it, for re-use.

Other objects of the invention will appear from the detailed description.

The invention consists in the several novel features hereinafter set forth and more particularly defined by claims at the conclusion hereof.

The drawing is a diagram of an apparatus embodying the invention, and for carrying out the improved method.

In the manufacture of paper, it is now common practice to digest the chips and treat them with causticized and black liquors and to progressively dilute the pulp magma before delivering it to the filter for separating the pulp from the digester liquor, and washing the pulp. The digested pulp with the hot digester liquor, as well understood in the art, is delivered to a tank A, from which it passes to a rotary suction filter which comprises a trough B and a drum B' in the trough and rotated by suitable mechanism. This drum is provided with a peripheral screen formed of a suitable filtering medium, such as wire-cloth, through which suction is applied to cause the pulp in the magma to adhere to the outside of the drum so it will be carried out of the trough until it is removed from the peripheral screen by releasing the vacuum and discharging it over a doctor plate $b^2$. Three suction pipes $c$, $c'$, and $c^2$ are connected to apply suction to the successive compartments or zones of the rotating drum B', as well understood in the art. The lower zone of the drum in the trough is subjected to suction through pipe $c$ to form a filter cake on the drum and to draw the strong liquor from the magma and deliver it into the separator D. After the pulp cake on the drum passes out of the trough into the next zone of its rotation, the filter-cake is subjected to suction from pipe $c'$. A spray-pipe $b^3$ discharges jets or streams of weak liquor onto the filtered cake while it is traversing said zone, and this wash will be sucked through the filter cake and delivered through pipe $c'$ into the separator D. After the filter cake on the drum passes the first washing zone, it passes through a zone which is subjected to suction from pipe $c^2$, and whilst traversing said zone, it is washed by water discharged onto it by a spray pipe $b^4$. Suction will be applied through pipe $c^2$ to the filter cake while it is traversing this zone to suck the wash-water from the filter cake and deliver it into the separator D'. Next, the filter cake is removed from the filter drum, and may be re-washed thereafter or otherwise treated, as well understood in the art.

In many instances, the pulp contains organic materials which cause the hot digester liquors to foam in the filter drum, so that the fluids withdrawn from the drum will consist largely of foam or froth. The pipes $c$, $c'$, and $c^2$ deliver this fluid tangentially into the lower portions of the separators D, D' respectively to cause the liquid-constituents to gravitate to the bottom of the separator tanks while the foam passes to the upper portions thereof which are subjected to suction, as hereinafter set forth. A pipe $d^2$ is adapted to conduct the liquid-constituent of the fluid drawn from the filter through pipes $c$ and $c'$ from separator D to the black or strong liquor storage for treatment in evaporators, preparatory to re-use. A pipe $d^3$ is adapted to conduct the liquid constituent of the weak liquor recovered from the water wash and drawn into separator D through pipe $c^2$, to a suitable weak liquor storage, from which it may be pumped for re-use through pipe $b^3$ for spraying the pulp with weak wash.

Heretofore, it has been proposed to separate the air from the liquid and foam in the separators or traps into which the strong and wash liquors are delivered from the filter, and to return the condensate to the liquid in the trap. It has been found in this practice that the condensation produced in the traps did not result in a full recovery of the chemicals in the foam when a substantial quantity of foam producing material was present in the wood, and one object of the invention is to provide a method and apparatus for drawing substantially all of the foam from the separators for treatment or heating to a high degree, which will result in the full recovery of the chemicals from the foam drawn from the filter.

A vacuum pump E of a type which is adapted to handle fluids, such as foam, and air, and discharge it under pressure, is connected by a pipe $e$ and branch $e'$, $e^2$ to the upper portions of the traps D, D', to subject the filter-drum to suction through pipes $c$, $c'$, and $c^2$ and to draw strong or weak liquor, foam, and froth through pipe $c$, and the weak liquor wash, froth and foam, through pipe $c'$ into the separator D, and to also draw the water-wash with the froth and foam produced in the filter, through pipe $c^2$, into the trap D'. The foam and froth in traps D, D' will be drawn through pipe $e$ into the inlet $d^8$ of the vacuum pump E. This type of pump is exemplified by a casing $e^3$ provided with an eccentric cylinder $e^4$ containing a rotor comprising a body $e^5$ and buckets or vanes $e^6$ which force the foam to a discharge duct $e^7$. This inlet $d^8$ is connected to two ports $d^9$ which lead into the side of the cylinder and outlet $d^7$ is connected to ports $d^{10}$ which lead from the cylinder. In passing through this pump, the foam is partially condensed, that is, a partial separation of the liquid from the foam occurs.

The foam is discharged under pressure through a pipe $e^8$ which delivers it into a flue or duct F, where it is subjected to direct contact with hot combustion gases to complete the condensation of the foam. A furnace or retort G is usually provided for heating the concentrated liquor used for digesting the pulp. This furnace delivers the products of combustion into the casing $h$ of a waste-heat boiler H. The gases from the furnace attain a high temperature, e. g., 2000° Fahr. The heat absorbed in the boiler H reduces the temperature to approximately 500° Fahr.

The flue F, into which the vacuum pump E delivers the foam and froth from the liquor traps, is connected to the boiler casing $h$, so that the hot combustion gases will pass therethrough and subject the froth and foam to a temperature of approximately 500° Fahr. This heat will condense or liquefy the chemicals in the froth and foam and the product will pass into a receiver $f$ which is connected to the passage F below the pipe $e^8$. The flue or duct F delivers the products of combustion into a scrubber I which comprises a tower $i$, to the lower end of which flue F is connected. A pipe $i^2$ discharges a spray of water downwardly through the tower $i$. This spray reduces the temperature of the gases in the tower I to about 160° Fahr. and falls into contact with any completely dehydrated chemicals carried through the duct F by the combustion gases, and dissolves such chemicals so they will settle in a receiver $i^2$ in the lower portion of the tower I. Thus any completely dehydrated chemicals are recovered for re-use. A pump M is connected by a pipe $m$ to deliver the water from receiver $f$ through a pipe $m'$ to the black liquor storage. This pump is also connected by pipe $m^2$ to circulate the water through the scrubber and stack, valves being provided to control the flow, so that the pump may be used for circulating water or for delivering the liquor to the liquor storage. A pressure or suction fan K is connected by a pipe $k$ under a baffle $i^3$ to the upper end of the stack $i$ to draw the combustion gases through furnace G, boiler H, duct F and stack $i$, and force them through a chimney or stack L. The non-condensible gases pass upwardly through the stack L to atmosphere.

The method and operation of the apparatus will be as follows: Pulp which has been digested and treated with hot digester liquor will be delivered into mixing tank A, and from there pass into the trough B of the filter. In the rotation of the drum B', the pulp will be sucked onto and form a cake on its peripheral screen, which will be carried around the drum where it will be subjected to the weak liquor wash from spray pipe $b^3$ and thence to the water-wash from spray pipe $b^4$ before it is removed from the drum by the doctor plate $b^2$. The suction applied to the drum from vacuum pump E through trap D and pipe $c$ will draw the black liquor and foam from the lower portion of the drum into the trap D; will draw the weak liquor and foam from the drum into the trap D; and will draw liquid and foam from the weak water-wash through pipe $c^2$ into trap D'. The liquid constituents drawn into these traps will be conducted from the bottoms thereof to the black liquor and weak liquor storages respectively. The froth and foam from traps D, D' will be drawn through pipes $e$, $e'$ $e^2$ into the casing of the pump E and forced through pipe $e^8$ into the duct F for combustion-gases where it will be heated sufficiently, approximately to a temperature of 500° Fahr., to condense the form and liquefy it, so it will pass into and be collected in the receiver $f$. By connecting the pump M to draw the liquor through pipe $m$ from trap $f$, this liquor will be forced back to the black liquor storage. The completely dehydrated chemicals recovered from the foam and liquid entering the duct F through pipe $e^8$ will be carried into the tower I and be dissolved with water which will be collected in the lower portion of the tower, and which will also be pumped to the black liquor storage by pump M.

The invention exemplifies a method of handling the froth and foam produced from the digester liquor and washing liquid in which the foam or froth is passed through a vacuum pump and delivered to means for heating it to condense or liquefy the chemical constituents of the foam, so that there will be a substantially complete recovery of the chemical constituents of the foam, also a method and apparatus in which the foam is subjected to the hot combustion gases from a waste heat boiler for this purpose; also a method and apparatus in which the completely dehydrated material recovered from the foam are dissolved and recovered for re-use.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. That improvement in the recovery of chemicals from digester liquor which consists in separating the foam from the liquid and separately recovering the chemicals from the foam.

2. That improvement in the recovery of chemicals of digester liquor which consists in withdrawing by suction the liquor and wash with the foam from a filter, separating the foam from the liquid, and separately recovering the chemicals from the foam.

3. That improvement in the recovery of chemicals of digester liquor which consists in withdrawing by suction, the liquor and wash with the foam from a filter, separating the foam from the liquid, separately disposing of the liquid, and separately recovering the chemicals from the foam.

4. That improvement in the recovery of chemicals from digester liquor which consists in separating the foam from the liquid and recovering the chemical from the foam by contact with hot combustion gases.

5. That improvement in the recovery of chemicals from digester liquor which consists in withdrawing by suction the liquor with the foam from a filter, separating the foam from the liquid and condensing the foam by contact with hot combustion gases.

6. That improvement in the recovery of chemicals from digester liquor which consists in separating the foam from the liquid, subjecting the foam to heat and recovering any completely dehydrated chemicals from the foam for re-use.

7. That improvement in the recovery of chemicals from digester liquor which consists in separating the foam from the liquid, and condensing the foam by contact with hot combustion gases, and dissolving any completely dehydrated material carried off by the gases for re-use.

8. In apparatus for handling digester liquor, the combination of a separator connected to receive the liquor and foam produced from a filter, a vacuum pump connected to withdraw the foam in the separator to the pump, a heater for condensing the foam, and means for delivering the foam from the pump to the heater.

9. In apparatus for handling digester liquor, the combination of a rotary suction filter, a plurality of separators connected to receive the liquor and foam from a filter, a vacuum pump connected to draw the foam in the separators to the pump, a heater for condensing the foam, and means for delivering the foam from the pump to the heater.

10. In apparatus for handling digester liquor, the combination of a rotary suction filter, a separator connected to receive the liquor and foam from the filter, a vacuum pump connected to draw the foam in the separator to the pump, a heater for condensing the foam, and means for delivering the foam from the pump to the heater.

11. In apparatus for handling digester liquor, the combination of a separator connected to receive the liquor and foam from a filter, a vacuum pump, means for conducting the foam to the vacuum pump from the separator, and means for conducting the foam from the pump into contact with combustion gases from a boiler to condense the foam.

12. In apparatus for handling digester liquor, the combination of a separator connected to receive the liquor and foam from a filter, a vacuum pump, means connecting the filter, a vacuum pump and the separator, through which the foam in the separator will be drawn to the pump, a waste heat boiler, and means for conducting the foam from the pump into contact with combustion gases from the boiler to condense the foam.

13. In apparatus for handling digester liquor, the combination of a separator connected to receive the liquor and foam from a filter, a vacuum pump, a pipe connecting the vacuum pump and the separator, through which the foam in the separator will be drawn to the pump, means for conducting the foam from the pump into contact with combustion gases from the boiler to condense the foam, and a receiver for the condensate.

14. In apparatus for handling digestor liquor, the combination of a separator connected to receive the liquid and foam from a filter, a vacuum pump, means connecting the vacuum pump and the separator through which the foam in the separator will be drawn to the pump, a heater, means for delivering foam from the pump to the heater to condense the foam, means to receive the condensate, and means for recovering the completely dehydrated chemicals separated from the condensate.

15. In apparatus for handling digester liquor, the combination of a separator connected to receive the liquor and foam from a filter, a vacuum pump, means connecting the vacuum pump and the separator, through which the foam in the separator will be drawn to the pump, a heater, means for delivering foam from the pump to the heater to condense the foam, means to receive the condensed liquid, and means for dissolving the completely dehydrated chemicals separated from the condensate.

16. In apparatus for handling digester liquor, the combination of a separator connected to receive the liquor and foam from the filter, a vacuum pump, means connecting the vacuum pump and the separator through which the foam in the separator will be drawn to the pump, a duct for combustion gases, means for delivering foam from the pump into contact with the gases, to condense the foam, means to receive the condensate, and means for recovering any completely dehydrated chemicals carried off by the gases.

17. In apparatus for handling digester liquor, the combination of a separator connected to receive the liquor and foam from a filter, a vacuum pump, means connecting the vacuum pump and the separator, through which the foam in the separator will be drawn to the pump, a duct for combustion gases, means for delivering foam from the pump to the duct, means to receive the condensate from the duct, and means for dissolving the completely dehydrated chemicals carried through the duct by the gases.

Signed at Monroe, Louisiana, this 15th day of July, 1930.

H. L. BROWN.